United States Patent [19]

McGregor et al.

[11] Patent Number: 4,808,381

[45] **Date of Patent: * Feb. 28, 1989**

[54] FLUID TRANSFER DEVICE

[75] Inventors: Gordon L. McGregor, Wilmington, Del.; David A. White, Folcroft, Pa.

[73] Assignee: E. I. Du Pont de Nemours and Company, Wilmington, Del.

[ * ] Notice: The portion of the term of this patent subsequent to Apr. 28, 2003 has been disclaimed.

[21] Appl. No.: 519,099

[22] Filed: Aug. 1, 1983

Related U.S. Application Data

[63] Continuation-in-part of Ser. No. 494,300, May 13, 1983, abandoned.

[51] Int. Cl.[4] .............................................. G01N 1/10

[52] U.S. Cl. .................................... 422/100; 215/307; 222/83.5; 422/102; 604/411

[58] Field of Search ........... 73/863.52, 863.58, 863.81, 73/863.85, 863.86; 141/329, 330; 604/411, 414, ; 215/88, 307, DIG. 3; 222/81, 83, 83.5; 422/100, 102, 103

[56] References Cited

U.S. PATENT DOCUMENTS

| | | | |
|---|---|---|---|
| Re. 31,555 | 4/1984 | Garren et al. | 73/864.11 |
| 2,436,291 | 2/1948 | Daniel | 215/307 X |
| 2,957,609 | 10/1960 | Holmes | 141/329 X |
| 3,449,081 | 6/1969 | Hughes | 422/101 X |
| 3,608,550 | 9/1971 | Stawski | 128/272 |
| 3,676,076 | 7/1972 | Grady | 422/100 X |
| 3,757,981 | 9/1973 | Harris et al. | 604/414 X |
| 4,024,857 | 5/1977 | Blecher et al. | 422/102 X |
| 4,133,319 | 1/1979 | Bloomfield | 222/83.5 X |
| 4,212,948 | 7/1980 | Dorn | 435/296 |
| 4,216,885 | 8/1980 | Sedam | 222/83.5 X |
| 4,278,437 | 7/1981 | Hagger | 356/246 X |
| 4,332,333 | 6/1982 | Linsey | 222/83 |
| 4,338,764 | 7/1982 | Percarpio | 53/328 X |

FOREIGN PATENT DOCUMENTS

| | | | |
|---|---|---|---|
| 468683 | 1/1952 | Italy | 222/81 |
| 673281 | 6/1952 | United Kingdom . | |
| 2025858A | 1/1980 | United Kingdom . | |
| 2026992 | 2/1980 | United Kingdom | 141/330 |

*Primary Examiner*—Barry S. Richman
*Assistant Examiner*—Michael S. Gzybowski

[57] ABSTRACT

A fluid transfer device having a cannula for piercing a stopper and a surrounding shroud to guide the cannula during piercing. The cannula is positioned parallel to and off-center from the shroud axis in a position opposite to the direction of the taper of the point of the cannula to compensate for the sideways movement created during the piercing of the closure and to cause the cannula tip to be located approximately on the receptacle axis after piercing.

5 Claims, 3 Drawing Sheets

Fig. 7.
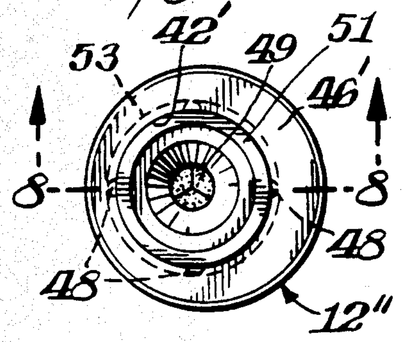
Fig. 9.
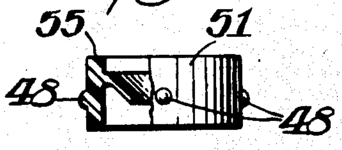
Fig. 8.
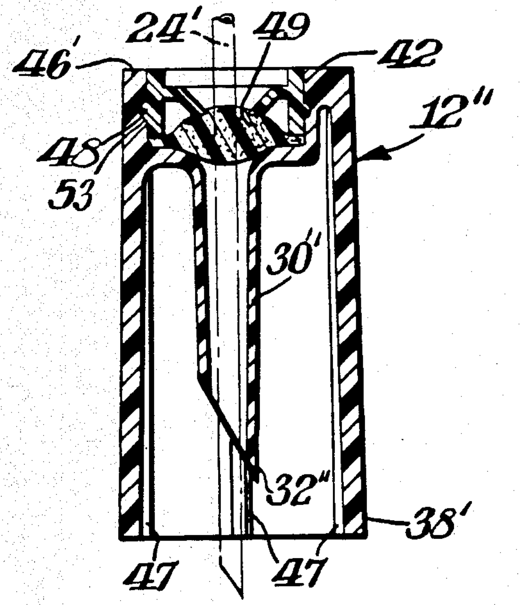
Fig. 10.
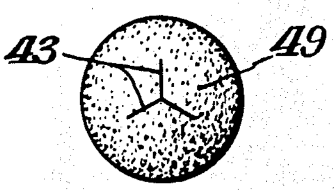
Fig. 11.
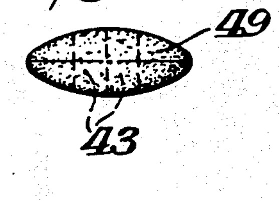
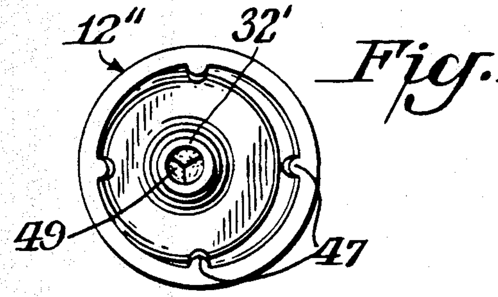
Fig. 12.

FLUID TRANSFER DEVICE

CROSS-REFERENCE TO RELATED APPLICATIONS

This is a continuation-in-part of an application Ser. No. 494,300 filed May 13, 1983, now abandoned.

This invention relates to a novel method and device for transferring fluids from a sealed receptacle to successive suction devices.

BACKGROUND OF THE INVENTION

In the clinical and biological research fields various devices have been constructed for receiving a sample of a fluid under test, separating the components of the fluid and separately withdrawing the components for further test and analysis. One such device is described in U.S. Pat. No. 4,212,948 issued July 15, 1980 to Gordon L. Dorn. The Dorn patent describes a technique for selectively separating microorganisms from any antimicrobial factors in a sample fluid such as a lysed blood sample. The blood sample is injected into a sterile confined zone containing both a cushioning agent and a lysing agent. The lysed blood sample is then centrifuged such that the microbial pathogens will pass out of suspension and collect in a layer adjacent the interface of the cushioning agent and the blood sample itself.

To facilitate removal of the separated sample components, a centrifuge receptacle having both top and bottom injectable stoppers or closures is used. The inner surface of the bottom closure is positioned at an angle which is a complement of the angle at which centrifugation is to be performed. Next a vent needle is inserted through the top closure, a second hypodermic needle with suction device or syringe attached is inserted through the bottom closure to a distance beyond the separated microbial pathogens into the residual blood sample which is then withdrawn. After vortexing, a second hypodermic needle with syringe is injected through the bottom closure to a distance immediately adjacent the inner surface of the bottom closure and the microbial pathogens removed and subjected to further test.

While the separation procedure described by Dorn is excellent, it does have certain disadvantages. For one, it requires extensive manipulation of two separate syringes and a third vent tube needle. Further the bottom entry approach can cause "bulging" of the cushioning layer and a remixing of the separated microbial pathogens with residual blood. This tends to defeat to some extent the entire purpose of the centrifugal separation.

Other devices are known which are capable of transfering fluid from a source into fluid collection containers. One such device is described in U.S. Pat. No. 3,608,550 issued Sept. 28, 1971 to Stawski. Stawski proposes using a cannula to pierce the rubber stopper of a fluid container. This cannula is of sufficient internal diameter so that a second cannula may be inserted through the first cannual and yet provide an air vent for the fluid container. A syringe is connected to the second cannula for each sample fraction to be withdrawn. While suitable, this structure is relatively complex requiring two components plus a plurality of syringes for each fluid container. Furthermore, it is not adapted to pierce relatively heavy rubber stoppers which are of sufficient thickness to maintain a vacuum within a tube as in the Dorn tube. Careful quidance is needed for the cannula in order to pierce the rubber stopper accurately along the axis of the fluid container.

Scislowicz in his U.S. Pat. No. 3,206,073 describes a dispensing container having a plastic spout adapted to pierce a rubber stopper 34. Even here the piercing of the stopper 34 is difficult to achieve in an accurate manner since there is no guidance provided and would be most difficult if the event it were used to pierce relatively thick rubber stoppers.

SUMMARY OF THE INVENTION

Many of the disadvantages of these prior art devices for transferring the contents of a receptacle to various suction devices are averted by the use of top entry procedures for accessing the interior of the receptacle and withdrawing its several contents using plastic transfer pipettes. More specifically, a device is constructed in accordance with this invention for facilitating the transfer of the contents of a receptacle to at least a pair of successive fluid suction members. Each suction member has a suction chamber and a stem communicating with the chamber. The receptacle has a open end sealably enclosed by an injectable closure. The transfer device includes a cannula adapted to pierce the closure. The cannula has a passageway adapted to pass a suction member stem through the closure and at the same time vent the interior of the receptacle to the atmosphere. Also, the cannula has an outer shroud adapted to slide over the open receptacle end closure to guide the cannula during penetration.

Preferably the cannula is formed of a rigid plastic with a sharpened tip capable of piercing the closure without causing "coring". This is a common occurrence with syringes of larger diameter as is required to permit the passage of a still thinner needle or stem therethrough. The cannula and shroud are integral. A suitable rigid plastic may be used such as an acetal resin or nylon. The shroud has an inside diameter greater than the outside diameter of the closure to facilitate expansion of the closure during the piercing operation. Also the shroud has a lower end with an internal flange adapted to engage lightly the closure for positioning the transfer device over the closure prior to piercing.

The fluid suction members are pipettes having an integral hollow bulb and a connected hollow stem. They also are constructed of a flexible plastic material. One of the pipettes has a stem of a length less than that of the receptacle such that it may be inserted through the cannula only to a distance capable of removing the residual blood and incapable of dipping down into the separated microbial pathogens. The second pipette has a length typically slightly greater than that of the receptacle plus closure so that it may extend to the very bottom of the receptacle and remove the microbial pathogens. To facilitate such removal when a tapered, bottom stopper is used, as described in the Dorn patent, the stem should be flexible to permit its bending over to the periphery of the tube-receptacle where the angled bottom stopper engages the sidewall of the tube. The ends of the stems may be rounded to facilitate their use. The hollow bulbs of the pipettes may be sized to accommodate the amount of fluid it is desired to withdraw.

In an alternative embodiment of the invention, the cannula is positioned off the axis of the shroud in a direction opposite that of the point of the cannula. This compensates for the tendency of the plastic cannula to offset in the direction of the angled cannula tip during piercing.

Using the transfer device of this invention greatly facilitates the removal of successive fractions of fluids from a receptacle. With this device, the shroud is first easily and lightly fitted over the receptacle top closure. The internal flange of the shroud facilitates this by engaging the exterior of the closure and holds the transfer device in position until the closure can be pierced. Piercing preferably is accomplished using a press although it can be accomplished by hand. During piercing, the cannula is guided by the transfer devices shroud which fits over the closure and receptacle. Following piercing, one of the suction members is inserted into the receptacle through the cannula and fluid is withdrawn. Next the one suction member is withdrawn and a second suction member is filled in a similar manner. Thus the several fractions can be removed each using a separate suction member in succession.

In an alternative embodiment of the inventors, the transfer device is provided with a septum in the cannula. This aids in containing aerosols within the receptacle and wiping the exterior surface of the pipette stem. The septum may be formed of a suitable foam or other compliant material that when precut provides easy access for the pipette stem.

BRIEF DESCRIPTION OF THE DRAWINGS

This invention may be more easily understood from a consideration of the drawings in which:

FIG. 7 is a plan view of a transfer device constructed in accordance with still another embodiment of this invention:

FIG. 8 is a cross-sectional elevation view of the transfer device illustrated in FIG. 7 taken along the section lines 8—8;

FIG. 9 is a pictorial view, partially cut away, of the retaining ring used in the transfer device of FIG. 7;

FIG. 10 is a plan view of the septum depicted in FIG. 10;

FIG. 11 is a side elevation view of the septum of FIG. 10; and

FIG. 12 is a bottom view of the transfer device of FIG. 7.

DETAILED DESCRIPTION OF THE PREFERRED EMBODIMENT

Figure 1:
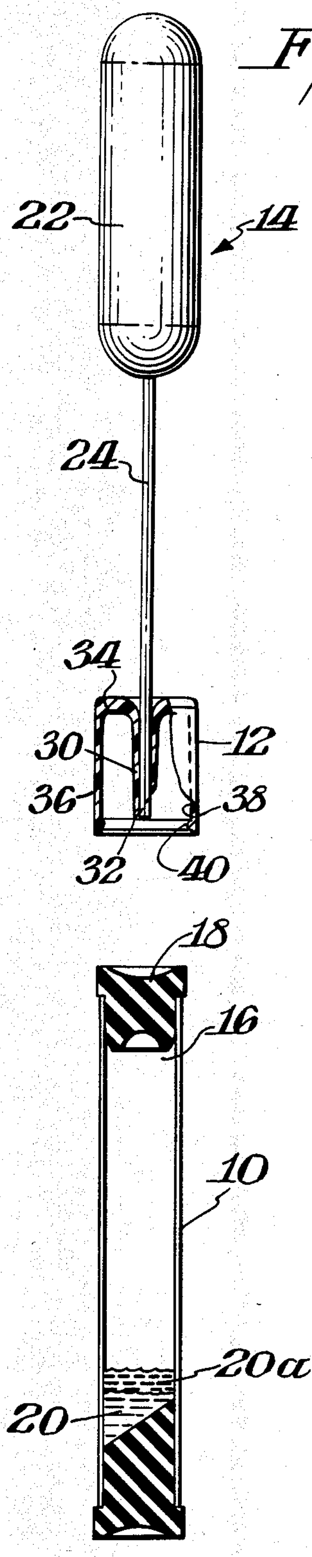
FIG. 1 is an exploded view of a transfer device and pipette constructed in accordance with a preferred embodiment of this invention.

There may be seen in FIG. 1 an exploded view incorporating a conventional centrifuge type receptacle 10, a transfer device 12 and a suction member 14. The receptacle 10 is a conventional elongated tubular receptacle of the type used for centrifugation and typically may be made of glass or the usual plastic used for this purpose such as polycarbonate or polypropylene. The receptacle 10 typically has a rounded bottom, although a shaped stopper closure 13 of the type described in the Dorn patent may be used as well. The receptacle 10 is closed at the open end 16 by a closure 18. The closure 18 may be of a conventional design, i.e., it is a conventional injectable stopper type member which closes the upper end of the tubular receptacle 10. Typically the closures are made of rubber self-sealing stoppers. A sample material to be processed, such as that described in the Dorn patent, is injected by a conventional hypodermic syringe through the closure 18 and is depicted by the fluids 20 and 20*a*.

In accordance with this invention, the transfer of the contents of the tubular receptacle 10 to a suction member 14 is facilitated by the transfer device 12. The fluid suction member 14 is typically in the form of a pipette having an integral hollow bulb 22 and connected hollow stem 24, all constructed of a flexible plastic material such as polyethylene. The transfer device 12 is cap-like in configuration with the cannula or piercing portion 30 having a sharpened, angled tip 32 extending downwardly along the central axis of the cap from a top, disk-like portion 34. Extending downwardly from the circumference of the disk-like portion 34 is a shroud 36 which has an inside diameter slightly greater than that of the closure 18. At the lower portion of the shroud 16, there is formed on the inside wall 38 an internal flange 40 whose inside diameter approximates that of closure 18. In like manner, the transfer device 12 may be fitted lightly over the closure 18 for initial positioning prior to piercing the closure 18. The transfer device should be formed of a rigid material that is moldable. Plastics such as an acetal resin or nylon are preferred.

Figure 2:
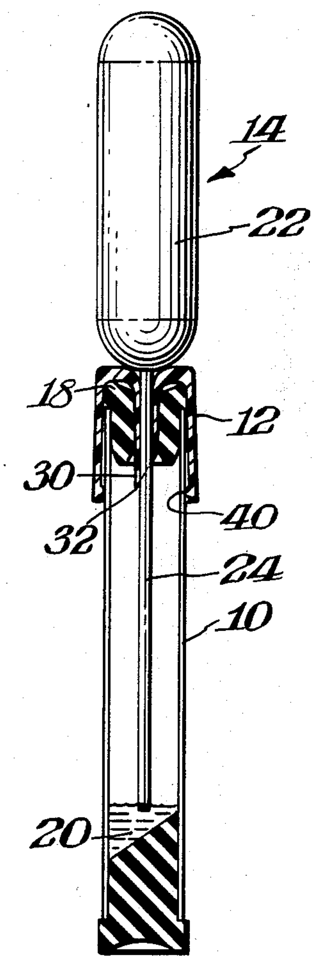
FIG. 2 is an assembled view in cross section of the combination illustrated in FIG. 1 using one type of pipette.

In use, the sample 20 is injected through the closure 18 using the conventional syringe as previously stated. The receptacle 10 is then centrifuged and the sample separated into two fractions as described by the Dorn patent and as illustrated as fractions 20 and 20*a* in FIG. 2. To effect the transfer of these two fractions from the receptacle 10, the transfer device 12 is positioned such that the inner flange 40 engages the top outside edge of the closure 18. The transfer device 12 is then pressed downwardly such that the shroud 36 slides over the exterior of the receptacle and is guided thereby to permit the cannula 30 to pierce the closure 18 and provide an opening to the atmosphere for the inside of the receptacle.

Figure 3:
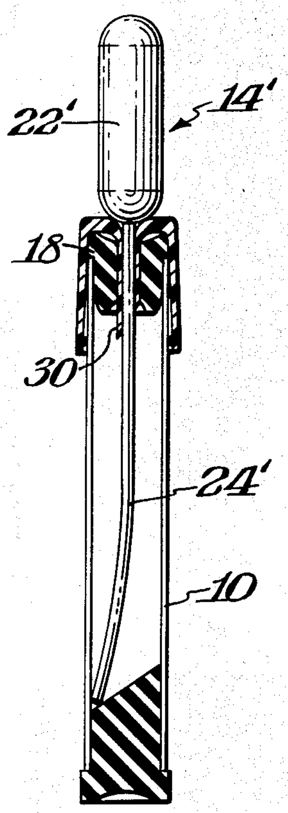
FIG. 3 is an assembled view of the assembly depicted in FIG. 1 depicting the use of a long steam pipette to withdraw the bottom fraction.

The length of the cannula 30 is sufficient to pass through and clear the bottom of the closure 18. Next a suction member 14 having a stem 24 is inserted through the hollow cannula 30. The outside diameter of the stem is slightly less than the inside diameter of the cannula 30 to maintain a vent to atmosphere for the inside of the receptacle. The stem 24 selected to be of suitable length such that when the bulb 22 engages the top of the transfer device 12, the bottom of the stem will extend down into the layer 20*a*, but not into the bottom layer 20 so as to permit all of the top layer 20a to be withdrawn. This is accomplished by squeezing the bulb 22 before insertion and allowing atmospheric pressure to force the fluid from layer 20a up the stem 24 into the bulb 22 of the suction member 14 as the bulb expands to its original shape. Next a second suction member 14' (FIG. 3) having a stem 24' of suitable length to extend to the bottom of the receptacle 10 is inserted through the cannula 30, the bulb 22' squeezed and the remaining fraction 20 sucked into the bulb 22.

In an alternative embodiment, the top of the transfer device 12 may have an adhesive backed metal flap (not shown) placed over the top to protect the sterility of the cannula 30, i.e., the top surface of the transfer device and the interior of the cannula. Furthermore the volume of the bulbs 22 and 22' of the different suction devices may be sized to approximate the volume of the different fractions 20 and 20*a* to be withdrawn from the tube. The transfer device 12 is particularly advantageous in that its shroud protects the sharp edge 32 of the cannula 30 to prevent personnel from being cut thereby. In adddition, it has the function of guiding the cannula 30 through the closure 18 along the axis of the receptacle 10. Also the shroud aids in maintaining the sterility of the cannula.

Figure 5:
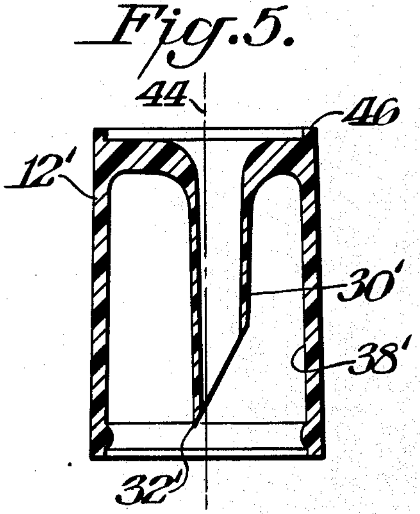
FIG. 5 is a partial cross-sectional view of a transfer device constructed in accordance with an alternative embodiment of this invention.
Figure 6:
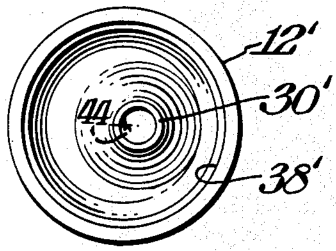
FIG. 6 is a bottom plan view of the transfer device of FIG. 5.

An alternative embodiment of the invention is shown in FIGS. 5 and 6 in which the transfer device 12' is modified so that the cannula 30' is positioned off of the axis 44 of the transfer device 12' in a direction opposite that of point 32', i.e., the point 32' is moved closer to the axis 44. This structure assists in overcoming the problem caused by the flexibility of the plastic material. As the cannula 30' pierces the closure 18 it tends to be guided by the V-shaped point 32' to one side. With this off center construction, the sideways movement of the cannula 30' permits the cannula to end its travel approximately along the axis 44 after it has pierced the closure 18. In a still further alternative embodiment, a top rim is formed on the top of the transfer device to aid in preventing contact with the top of the transfer device. Sterilization is more easily maintained thereby.

Figure 4:
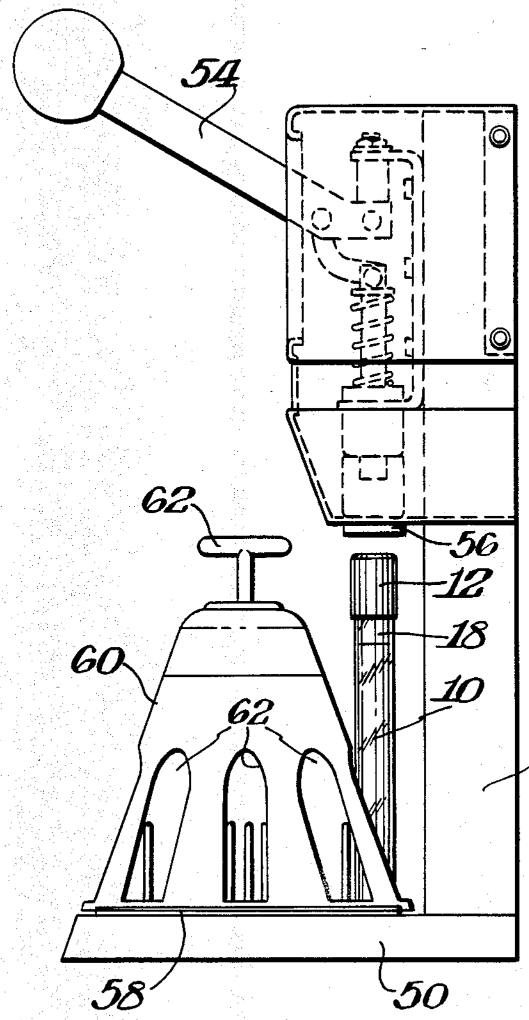
FIG. 4 is a side elevation view of a press and rack that may be used to facilitate piercing the closure of the receptacle in FIG. 1.

While the cannula 30 may be caused to pierce the closure 18 manually, the operation is greatly facilitated by the use of a simple press of the type depicted in FIG. 4. In FIG. 4 there is seen a press of convention design having a base member 50, an upright member 52, a lever 54 for operating the press and a press head 56. When the lever 54 is depressed the press head 56 moves downwardly so as to compress any object between it and the base plate 50. The press head 56 is constructed so that it engages the top of the transfer device 12 and causes it to move downwardly over the receptacle 10 thereby causing the cannula 30, guided by the shroud 36 to pierce the closure 18. To facilitate the operation, a circular base plate 58 is positioned on the base member 50 to house a stand 60 which is frusto-conical in configuration and has a handle 62 to permit it to be lifted and rotated. Along the peripheral bottom portion of the stand 60 are formed recesses 62, each adapted to receive and vertically position one of the receptacles 10. Thus as the housing 60 is rotated to position each successive tube under the press 56, the successive receptacles 10 may be pierced and the receptacles 10 opened as required to permit access of the suction devices.

In still another alternative embodiment of the invention, illustrated in FIGS. 7 through 12, inclusive, a transfer device 12" is modified over those illustrated in FIGS. 1–6 to maintain the receptacle closed. As modified, the top portion forms a rim 46' defining a cuplike receptacle 42' adapted to receive an easily penetrable and enclosable septum 49. The septum 49, penetrable by the plastic elongated stem 24, preferably may be formed of a polyurethane foam such as those sold by Scott Foam Division. This material preferably has small pores, i.e., approximately 273 pores/cm and is soft, spongy, and capable of absorbing fluids. Preferably it is hydrophillic on its surface. The septum 49 is depicted as being oval in vertical cross-section. The oval shape is result of the natural crimp that occurs when the septum is die cut from sheet polyurethane foam. The center portion of the septum as seen in FIG. 10 is cut vertically in a Y-shaped configuration 43 to permit the elongated portion 24' of the suction device to easily pass therethrough and yet maintains the receptacle closed.

A retaining ring 51, as seen in FIG. 9, is annular in configuration with a recessed mid-portion which when positioned in the recess 42 maintains the septum clamped in position over the opening of the cannula 30" and yet provides access for the elongated portion 29' of the suction device. The periphery of the retaining ring 51 preferably has dimples 48, formed in each quadrant which are adapted to engage a recessed ring 53 formed in the inner wall of the recess 42'. The dimples 48 act as a detent, together with the ring 50, to insure that the retaining ring 51 remains in position. Alternatively, the outer periphery may have no dimples and press fit in the recess 42 or knurled and press fit. The outer wall of the retaining ring 51 is extended axially to provide a rim 55 which aids in the assembly of the device. The axial length of the retaining ring is such as to firmly clamp the peripheral edge of the septum when the rim 55 is flush with the rim 46'.

In this embodiment, the cannula 30" is extended somewhat and the shroud 38' is likewise extended below the tip 32" of the cannula to protect the point from being damaged or from harming people handling this device. Also the shroud 38' is provided with four axial ribs 47 on its inner surface to facilitate its sliding over the receptacle. As before, the retaining ring 46 and the transfer device are formed of the same plastics as those previously described.

With this arrangement, using the receptacle and rim 46', there is reduced cross-contamination between caps from the pressurehead. Further, aerosols are contained within the receptacle 10 because of the use of the septum and any excess of the serum contents of the receptacle are removed from the exterior of the stem 24 due to the wiping action of the septum when the stem is removed from the receptacle.

We claim:

1. A device for facilitating the transfer of the contents of a tubular receptacle having an axis to a fluid suction member, the suction member having a suction chamber and stem communicating with the chamber, the receptacle having an open end sealably closed by an injectable closure, said device comprising:

a cannula having an axis and adapted to pierce a closure and having a passageway adapted to pass a suction member stem through the closure and vent the interior of 9 receptacle to the atmosphere, the cannula having an outer shroud with an axis, said shroud adapted to slide over an open receptacle end to guide the cannula during piercing, the cannula having a pointed tip defined by a generally planar cut slanted to the cannula axis to form an acute angle for piercing the closure, the cannula being positioned parallel to and off-center from the shroud axis in a position opposite to the direction of the taper of the point of the cannula to compensate for the sideways movement created during piercing the closure and to cause the cannula tip to be located approximately on the receptacle axis after piercing.

2. A device set forth in claim 1 wherein the cannula has a penetrable, reclosable member closing the passageway and the shroud has an upper flange defining a cuplike receptacle and which device also includes an annular retainer positioned in said cuplike receptacle securing the penetrable member in the passageway.

3. A device set forth in claim 2 wherein the shroud has an inner wall with axial ribs to position the shroud relative to the receptacle.

4. A device set forth in claim 2 wherein the flange has an inside wall with a ring-groove formed therein and the retainer has an outside wall with dimples formed thereon adapted to engage the ring-groove in a detent-like action to maintain the retainer in position and wherein the shroud inner wall defines axial ribs to position the shroud relative to the receptacle.

5. A device for facilitating the transfer of the contents of a tubular receptacle having an axis to a fluid suction member, the suction member having a suction chamber and stem communicating with the chamber, the receptacle having an open end, said device comprising:

an injectible closure positioned in an open end of a receptacle, a cannula having an axis and adapted to pierce the closure and having a passageway adapted to pass a suction member stem through the closure and vent the interior of the receptacle to the atmosphere, the cannula having an outer shroud with an axis, said shroud adapted to slide over the open receptacle end to guide the cannula during piercing, the cannula having a pointed tip defined by a generally planar cut slanted to the cannula axis to form an acute angle for piercing the closure, the cannula being positioned parallel to and off-center from the shroud axis in a position opposite to the direction of the taper of the point of the cannula to compensate for the sideways movement created during piercing the closure and to cause the cannula tip to be located approximately on the receptacle axis after piercing.

* * * * *